Aug. 12, 1969 C. P. PICKUP ET AL 3,461,372
D.C. TO A.C. POWER CONVERTER
Filed Jan. 17, 1966
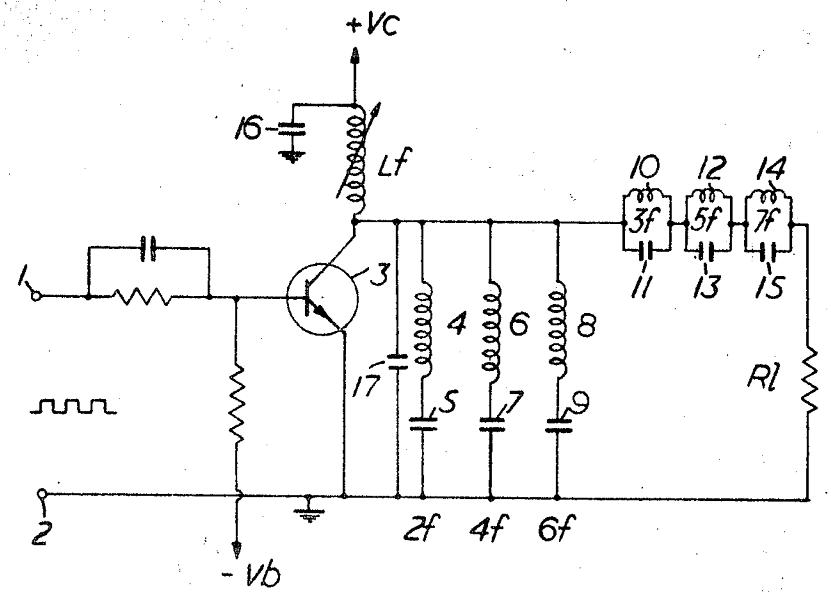
Inventors
CLIVE P. PICKUP
JOHN R. BARTON
By [signature]
Attorney United States Patent Office 3,461,372
Patented Aug. 12, 1969

3,461,372
D.C. TO A.C. POWER CONVERTER
Clive Parnell Pickup and John R. Barton, New South Wales, Australia, assignors to International Standard Electric Corporation, New York, N.Y., a corporation of Delaware
Filed Jan. 17, 1966, Ser. No. 521,189
Claims priority, application Australia, Jan. 22, 1965, 54,246/65
Int. Cl. H02m *1/12;* H03k *5/08*
U.S. Cl. 321—9 6 Claims

ABSTRACT OF THE DISCLOSURE

A D.C. to A.C. converter in which power from a D.C. source fed through the collector-emitter circuit of a transistor is alternately switched on and off by a square wave applied to the base of said transistor. The lower even harmonics are attenuated by a plurality of series resonant circuits, each connected between the collector and emitter, while the lower odd harmonics are blocked from the output by a series of parallel resonant circuits connected between the collector and output, thereby providing a sinusoidal output at a frequency equal to the fundamental frequency of said square wave.

This invention relates to electric power converters and is particularly applicable to high efficiency transistorized amplifiers operating at radio frequencies, but is not restricted thereto.

High efficiency amplifiers using thermionic valves are well known. Thus V. J. Tyler in Marconi Review, volume XXI, No. 130, 3rd Quarter, 1958, described "A New High-Efficiency High-Power Amplifier." Although described in this paper as a class C amplifier, in substance the thermionic valve is operated as a switch. There has been some use in the literature of class D for this type of device. In substance the valve is operated as a switch at the driving frequency and converts D.C. power from a source to A.C. power at the driving frequency. It will realized that in such operation, in order to produce power with minimum loss, the power loss in both the active switching device and the associated circuitry must be minimised. Loss in the switching device is dependent upon the potential existing across the switch during conduction. To produce high powers the active switch should be closed as long as possible during its cycle.

Tyler solved the problem of switching loss in thermionic valve circuits by developing a substantially square wave-form voltage across the valve, harmonic voltages being introduced which combined with the fundamental in such a way as to provide the desired wave-shape. The number and amplitude of harmonics used was a function of the conduction angle desired. Complex tank circuits were used which involved placing parallel resonant tuned circuits between the anode of the valve and the ordinary tank circuit. These provided a high impedance to the desired harmonics so as to develop the harmonic voltages, while the desired output fundamental component was developed across the normal tank circuit. The resultant wave-form existing across the switching valve was then flattened during the period of conduction. This solution, as indeed in any conventional class C amplifier, requires tank circuits with high loaded Q's to attenuate the harmonics.

Major disadvantages with this prior solution are the difficulty in providing high unloaded Q's for the harmonic circuits, and the bulk of these circuits at low circuit impedances. Thus substantial losses occurred due to the resulting large circulating currents. This is aggravated if an attempt is made to apply this earlier solution to transistors by the low impedances into which they work. Furthermore it is impracticable to add harmonic circuits in series with the transistor because of the addition of inductance into the circuit which causes voltage spikes to appear across the transistor at both the onset and termination of conduction. The voltage spikes can assume large and dangerous magnitudes especially at fast switching speeds.

The invention replaces the conventional tank circuit and parallel tuned harmonic resonators (if any) by a combination of a number of series and parallel tuned circuits and parallel resonant circuits and/or low pass filter sections so proportioned as to present the required impedance at the fundamental and harmonic frequencies with substantially reduced energy storage. This reduces substantially the size of the output circuits of the amplifier, and in the case of transistor amplifiers avoids the necessity of connecting harmonic circuits in series with the collector which, as pointed out above, is impracticable in high powered circuits. In comparison with a conventional class C amplifier the present invention provides superior means for reducing unwanted harmonic content in the output.

The invention is illustrated below as it applies to a high efficiency transistorized amplifier. However, the invention can be applied also to amplifiers employing electron tubes or other current controlling or switching elements. Further the invention applies to other systems whose function also is the conversion with high efficiency of direct current to alternating current rather than amplification. The idea may also be applied at audio or power frequencies as well as at radio frequencies.

According to this invention a high efficiency electric power converter for converting direct current to alternating current comprises a switch, means for driving the switch at a driving frequency, a plurality of series resonant tuned circuits connected across the switch output, each series resonant circuit being tuned to a different even order harmonic of the driving frequency and an inductance in the switch output circuit which is parallel resonant at the said driving frequency with the effective capacitance of all the series resonant circuits. Preferably a parallel resonant trap for every harmonic frequency used in the wave-shaping process (odd order harmonics) should be placed in series with the load ensuring that no or little harmonic power is delivered to the load. Alternatively a low pass filter coud be used to reduce the amount of harmonic power delivered to the load.

Reference will now be made to the accompanying drawing lodged with the specification which shows the invention as applied to a high efficiency radio frequency transistorized amplifier.

A square wave R.F. input at terminals 1, 2 having a fundamental driving frequency is applied to the base of the transistor 3 which is operated as a switching device thereby controlling the flow of power in the collector circuit of said transistor which is provided by a suorce of D.C. power, $+V_c$. A plurality of series resonant circuits are connected across the transistor from collector to emitter. Each series resonant circuit is tuned to a different even harmonic of the fundamental frequency. Under these conditions parallel resonance occurs for frequencies between each of the series resonances, and the circuit elements are so chosen as to cause these parallel resonances to present high impedance to the odd harmonics of the carrier frequency. In this manner the odd harmonic voltage wave form are produced. In practice, the number of series tuned circuits will be fairly small and the number will be chosen to meet technical requirements in an economic fashion. Thus, for example, there may be three series resonant circuits, the first 4.5 tuned to the second harmonic, the second 6.7 tuned to the fourth harmonic, and the third 8.9 tuned to the sixth harmonic. The collector is connected to the power supply $+V_c$ by way of an inductance $L_f$ whose value is selected or adjusted so that it resonates with the effective capacitance of all series resonant circuits at the fundamental frequency. Capacitor 17 which includes the output capacity of the transistor may be provided to provide a path to ground for higher order harmonic currents. The capacitor, if used, need not significantly increase the fundamental energy storage. Preferably a plurality of parallel resonant circuits are connected in series between the collector and the load $R_L$, each parallel resonant circuit being tuned to a different odd harmonic. As before, in practice only a small number of such circuits will be required, for example three as shown. The first circuit 10.11 is tuned to the third harmonic, the next 12.13 to the fifth harmonic, and the third 14.15 to the seventh harmonic. These parallel resonant circuits constitute traps for the harmonic frequencies used in the wave-shaping process, ensuring that little harmonic power is delivered to the load $R_L$ and that the waveform of said power delivered to the load is a sinusoid of frequency $f_o$, where $f_o$ is the fundamental frequency of the above-mentioned square wave input. Capacitor 16 is a bypass capacitor. The parallel resonant circuits may be replaced by a low-pass filter.

It is to be understood that the foregoing description of specific examples of this invention is made by way of example only and is not to be considered as a limitation on its scope.

What we claim is:

1. A high efficiency electric power convertor for converting direct current to alternating current comprising a switch, a source of pulses independent of said switch connected to drive the switch at a driving frequency for periodically turning said switch on and off, a plurality of series resonant tuned circuits connected across the switch output, each series resonant circuit being tuned to a different even-order harmonic of the driving frequency, and an inductance in the switch output circuit which is parallel resonant at said driving frequency with the effective capacitance at that frequency of all the series resonant circuits.

2. A power converter as claimed in claim 1 wherein the circuit elements are so chosen that the parallel resonances which occur between each of the series resonances are such as to present high impedance to the odd-order harmonics of the carrier frequency.

3. A power converter according to claim 2 including a plurality of parallel resonant circuits between the switch output and the load, each last-mentioned circuit being tuned to a different odd-order harmonic of the driving frenquency.

4. A power converter according to claim 2 including a low pass filter between the switch output and a load.

5. A power converter according to claim 3 including a capacitor across the series resonant circuits to provide a path for higher order harmonic currents.

6. A power converter according to claim 3 wherein the switch is a transistor.

References Cited

UNITED STATES PATENTS

| | | | |
|---|---|---|---|
| 2,052,888 | 9/1936 | Eberhard | 331—166 X |
| 2,675,474 | 4/1954 | Lindenblad | 307—261 X |
| 2,149,077 | 2/1939 | Vance | 333—76 X |
| 2,579,525 | 12/1951 | Varela | 333—76 X |
| 2,995,709 | 8/1961 | Beardwood et al. | 328—27 |

FOREIGN PATENTS

| | | |
|---|---|---|
| 272,405 | 3/1951 | Switzerland. |
| 410,182 | 1934 | Great Britain. |

JOHN F. COUCH, Primary Examiner

W. H. BEHA, Jr., Assistant Examiner

U.S. Cl. X.R.

328—27; 333—76